A. CASALI.
NON-REMOVABLE NUT.
APPLICATION FILED JUNE 9, 1921.

1,399,191.

Patented Dec. 6, 1921.

INVENTOR.
Antonio Casali

UNITED STATES PATENT OFFICE.

ANTONIO CASALI, OF HAMILTON, ONTARIO, CANADA, ASSIGNOR OF ONE-HALF TO ERNEST INKERMAN TAYLOR, OF HAMILTON, ONTARIO, CANADA.

NON-REMOVABLE NUT.

1,399,191. Specification of Letters Patent. Patented Dec. 6, 1921.

Application filed June 9, 1921. Serial No. 476,274.

*To all whom it may concern:*

Be it known that I, ANTONIO CASALI, a subject of the King of Italy, and a resident of the city of Hamilton, in the county of Wentworth, Province of Ontario, Dominion of Canada, have invented certain new and useful Improvements in Non-Removable Nuts, of which the following is a specification.

My invention relates to improvements in non-removable nuts and the object of the invention is to devise a nut which after being screwed onto a bolt to occupy the desired tightened position thereon, cannot be removed without cutting or otherwise destroying the nut; and a further object is to make such a nut in a simple and convenient form.

My invention consists essentially of a nut comprising separate male and female members having opposed engaging shoulders, the male member having an axial threaded orifice therethrough adapted to engage the thread on the bolt, and a portion of the exterior peripheral surface of the male member being provided with an opposed screw thread adapted to engage an internally threaded portion of the female member, all as hereinafter more particularly described and illustrated in the accompanying drawings in which.

Like characters of reference indicate corresponding parts in the different views.

1 is my improved nut which comprises the male member 2 and the female member 3.

4 is a bolt upon which the nut is engaged and 5 and 6 are two pieces of material secured together by means of the bolt.

The male member 2 is in the form of a cylindrical sleeve having an axial orifice extending therethrough, which orifice is provided with a right hand screw thread $2^1$ adapted to engage the thread $4^1$ of the bolt.

The upper portion of the male member comprises the enlarged annular head $2^2$ the outer peripheral edge $2^3$ thereof being smooth.

The lower portion $2^4$ of the male member is of reduced diameter and forms with the head $2^2$ the undercut shoulder $2^5$ which shoulder is provided with the concentric ball race $2^6$ for a purpose as will hereinafter appear.

The outer peripheral surface of the portion $2^4$ is provided with the left hand screw thread $2^7$.

The female member 3 is in the form of a hexagonal nut having an axial orifice $3^1$ extending therethrough. The lower portion of this axial orifice is provided with a left hand screw thread $3^2$ adapted to engage the outer thread $2^7$ of the male member.

The upper portion of the orifice $3^1$ is of enlarged diameter and forms the annular recess $3^3$ having the smooth wall $3^4$.

The base of this recess $3^3$ forms the upwardly disposed shoulder $3^5$ which is provided with the concentric ball race $3^6$ for a purpose as will presently appear.

The diameter of the annular recess $3^3$ in the female member is such as to receive the enlarged head $2^2$ of the male member, in which position the smooth faces $2^3$ and $3^4$ slidably engage each other.

7 are a series of anti-friction balls which are inserted between the shoulders $2^5$ and $3^5$ and engage the registering ball races $2^6$ and $3^6$.

The construction and operation of my invention is as follows:

The nut is assembled by simply inserting the balls 7 into the race $3^6$ in the female member and inserting the male member into its operative position within the female member. In this operation the left hand thread $2^7$ on the male member engages the left hand thread $3^2$ of the female member and when fully engaged the male and female members occupy the positions shown in Fig. 1, the ball races $2^6$ and $3^6$ registering and forming race ways for the balls 7.

When it is desired to mount the nut upon a bolt, as for instance when securing two members 5 and 6 together (see Fig. 1), the operation is exactly similar to that where an ordinary one piece nut is used.

The nut is screwed into the tightened position by rotating the female member by means of a wrench or otherwise, in a clockwise direction, which rotation is continued until the nut is drawn as tightly as desired into place.

Figure 2:
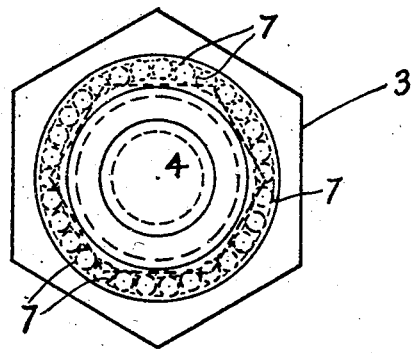
Fig. 2 is a plan view of Fig. 1 showing the nut and bolt only.
Figure 3:
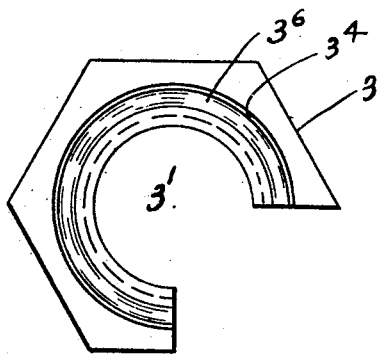
Fig. 3 is a plan view of the female member of my nut having a portion cut away.
Figure 1:
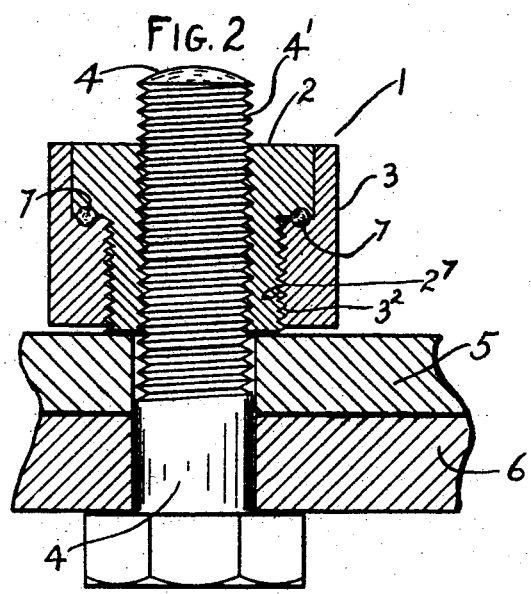
Figure 1 is a sectional elevation showing my improved nut operatively engaging a bolt.
Figure 4:
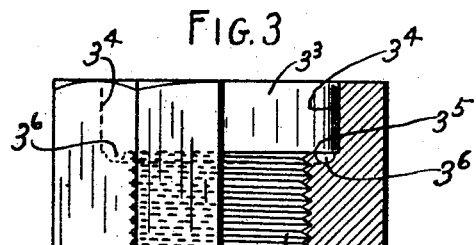
Fig. 4 is an elevation of Fig. 3.
Figure 5:
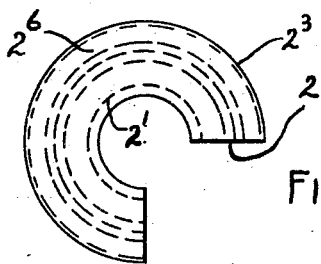
Fig. 5 is a plan view of the male member of my nut having a portion cut away.
Figure 6:
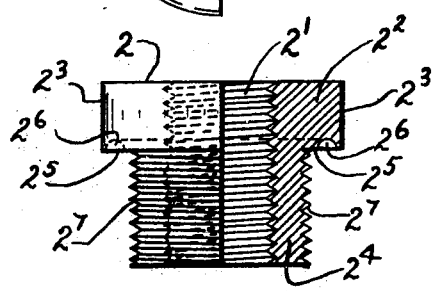
Fig. 6 is an elevation of Fig. 5.

In this operation it will be clear from the drawings that starting with the parts of the nut in their assembled positions, as shown in Fig. 1, that clockwise rotation of the female member will also cause the male member to rotate therewith, due to the engagement between the left hand threads $2^7$ and $3^2$ which will lock the parts rigidly together, thus screwing the nut onto the bolt.

This follows from the screw threads $2^7$ and $3^2$ being left hand while the threads $2^1$ and $4^1$ are right hand.

In this way during clockwise rotation of the female member the nut rotates as a unit and may be screwed into place as firmly as desired.

Consider now the removal of the nut after it has been brought firmly into the tightened position illustrated in Fig. 1, in which a considerable pressure will exist between the nut and the member 5.

In order to remove the nut it is evident that the male member 2 must be rotated in an anti-clockwise direction, but the only way of rotating the male member, in either direction, is by means of the female member since it is otherwise inaccessible.

If now the female member 3 be rotated, by means of a wrench or otherwise, in an anti-clockwise direction, it will be seen that it will have no tendency whatever to rotate the male member, since it will travel downwardly upon the male member as it follows the course of the left hand threads and the balls 7 will prevent any gripping action between the male and female members.

The female member may move downwardly a slight amount until it engages firmly the face of the member 5 after which engagement, any further attempted anti-clockwise rotation will tend to tighten still further the grip of the nut.

From the foregoing it will be seen that I have devised a nut which will be ordinarily non-removable after it is tightened upon a bolt and the only way of removing the nut will be by cutting or otherwise destroying it, or the bolt.

An article of this type will be of great value and will prevent many accidents if used in cases where it is essential to guard against the accidental loosening of parts and will be a great improvement over the many forms of lock nuts now in use.

Various modifications may be made in my invention without departing from the spirit of the invention or the scope of the claims and the exact form shown is therefore to be taken as illustrative only and not in a limiting sense.

For instance, it will be obvious that the threads could be reversed to provide a nut for use on a left hand bolt. Also the peripheral shape of the female member could be other than hexagonal.

What I claim as my invention is:

1. A nut comprising a male and a female member, a portion of the outer peripheral surface of the male member having threaded engagement with a portion of the internal surface of the female member, opposed engaging shoulders on the male and female members, anti-friction bearing means co-acting between said opposed shoulders, the male member provided with an internally threaded axial orifice, the thread of which is of opposed direction to the aforesaid engaging thread between the male and female members.

2. A nut comprising a male and a female member, the male member provided with an internally threaded axial orifice extending therethrough, an enlarged annular head at the upper end of the male member and a depending concentric skirt of reduced diameter extending axially from the head, the junction of the head and skirt forming an undercut shoulder, the female member provided with an axial orifice therethrough, the upper portion of said orifice being of enlarged diameter adapted to engage the annular head of the male member and the lower portion of said orifice being of reduced diameter and adapted to engage the depending skirt of the male member, the junction of the upper and lower portions forming an upwardly disposed shoulder in the female member, the skirt of the male member having threaded engagement with the lower reduced portion of the orifice in the female member, the direction of the thread thereof being opposed to that of the aforesaid internal thread in the male member, the peripheral edge of the head on the male member freely engaging the upper enlarged portion of the orifice in the female member and the undercut shoulder on the male member adapted to engage the upwardly disposed shoulder in the female member.

3. A nut comprising a male and a female member, the male member provided with an internally threaded axial orifice extending therethrough, an enlarged annular head at the upper end of the male member and a depending concentric skirt of reduced diameter extending axially from the head, the junction of the head and skirt forming an undercut shoulder, the female member provided with an axial orifice therethrough, the upper portion of said orifice being of enlarged diameter adapted to engage the annular head of the male member and the lower portion of said orifice being of reduced diameter and adapted to engage the depending skirt of the male member, the junction of the upper and lower portions forming an upwardly disposed shoulder in the female member, the skirt of the male member having threaded engagement with the lower reduced portion of the orifice in the female member, the direction of the thread thereof being opposed to that of the aforesaid internal thread in the male member, the peripheral edge of the head on the male member freely engaging the upper enlarged portion of the orifice in the female member and the undercut shoulder on the male member adapted to engage the upwardly disposed shoulder in the female member and anti-friction bearing means co-acting between the aforesaid engaging shoulder.

4. A nut comprising a male and a female member, the male member provided with an internally threaded axial orifice extending therethrough, an enlarged annular head at the upper end of the male member and a depending concentric skirt of reduced diameter extending axially from the head, the junction of the head and skirt forming an undercut shoulder, the female member provided with an axial orifice therethrough, the upper portion of said orifice being of enlarged diameter adapted to engage the annular head of the male member and the lower portion of said orifice being of reduced diameter and adapted to engage the depending skirt of the male member, the junction of the upper and lower portions forming an upwardly disposed shoulder in the female member, the skirt of the male member having threaded engagement with the lower reduced portion of the orifice in the female member, the direction of the thread thereof being opposed to that of the aforesaid internal thread in the male member, the peripheral edge of the head on the male member freely engaging the upper enlarged portion of the orifice in the female member and the undercut shoulder on the male member adapted to engage the upwardly disposed shoulder in the female member, and a ball bearing co-acting between the aforesaid engaging shoulders.

ANTONIO CASALI.

Witnesses:
  JOHN J. MAYNARD,
  NORIEEN COLES.